Figure 8:
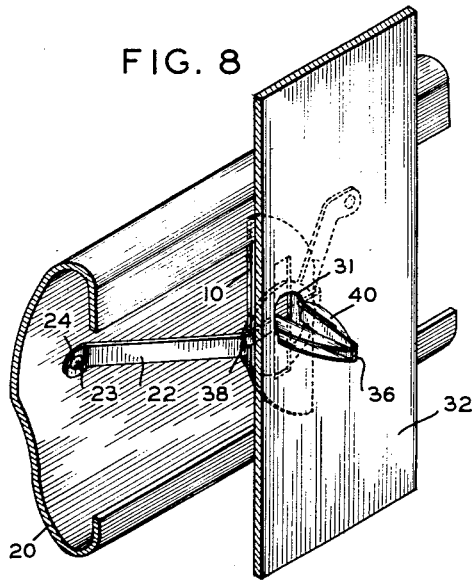

April 18, 1961 C. D. WEST 2,979,795
ADAPTABLE MOLDING FASTENER
Filed Sept. 22, 1958 2 Sheets-Sheet 1
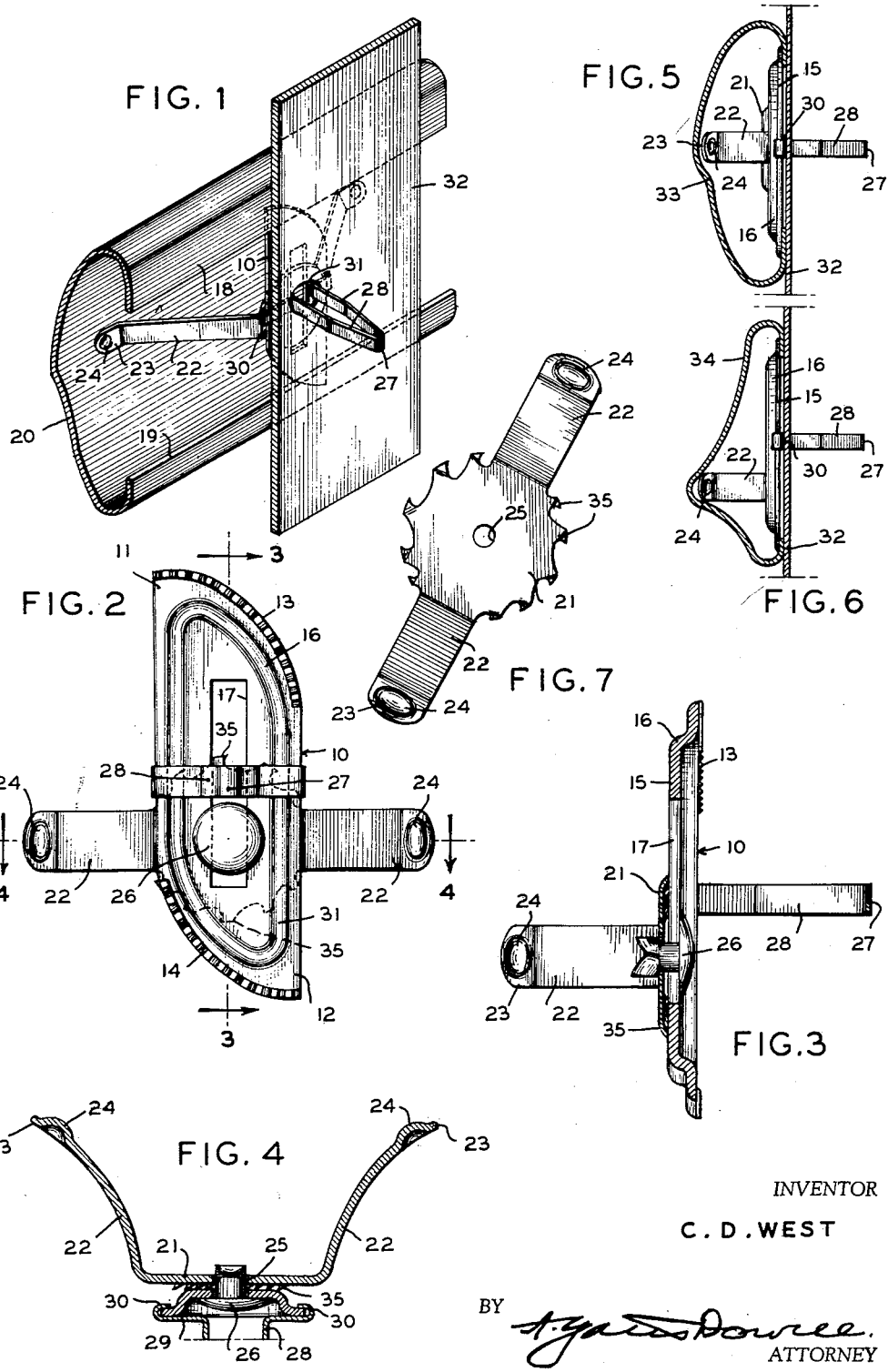
INVENTOR
C. D. WEST April 18, 1961 C. D. WEST 2,979,795
ADAPTABLE MOLDING FASTENER
Filed Sept. 22, 1958 2 Sheets-Sheet 2

INVENTOR
C. D. WEST
BY
ATTORNEY

United States Patent Office 2,979,795
Patented Apr. 18, 1961

2,979,795

ADAPTABLE MOLDING FASTENER

Charles D. West, 2710 N. Orange Ave., Orlando, Fla.

Filed Sept. 22, 1958, Ser. No. 762,569

7 Claims. (Cl. 24—73)

This invention relates to attaching means of various kinds employed for securing finishing materials to objects, such as that used for attaching hollow molding, trim strips or the like, to supporting surfaces, such as the body of an automobile or other structure of sheet metal or other material.

The invention relates more particularly to hollow moldings having inturned edges or flanges and attaching means for anchoring the same in place on an automobile, aircraft, or other structure especially to enhance the beauty of the same when appearance is important.

Heretofore trims of various types have been produced, and attached by various types of fasteners including T-shaped members with threaded shanks and nuts by which the fastener and finished strip or the molding could be secured firmly in fixed position. These devices have not been entirely satisfactory because the nuts were applied on the rear or remote side of the structure where frequently they were inaccessible and space was at a premium. Accordingly, the attachment of the finishing trim or molding has been tedious, complicated, time-consuming and expensive, it being necessary at times to remove and replace such molding or trim.

It is an object of the invention to provide a fastener capable of being used for attaching to supports of various types of moldings of different shapes and sizes and with inturned flanges between and behind which a fastener can be inserted for securing the molding in place, as well as a fastener which can be readily applied entirely from the exterior.

Another object of the invention is to provide a simple and inexpensive substantially universal fastener, applicable to moldings of different widths and depths, and regular or irregular cross section suitable for attaching such molding to a support, even when one is offset relative to the other and where there is need for the fastener to adjust itself automatically to compensate for misalignment or imperfect location of apertures which occurs in mass production.

Another object of the invention is to provide a fastener, including an anchoring member for engaging the member to which the molding is to be attached, a spring retainer for holding the anchoring member in place in a molding prior to application of the molding to a support, and a spring clip for application to the anchoring member and by which the spring retainer and anchoring member may be secured in place, such spring clip being of yieldable spring stock to permit the insertion of a portion of the clip through a relatively small opening in a support so that the assembly may be secured to such support.

Figure 9:
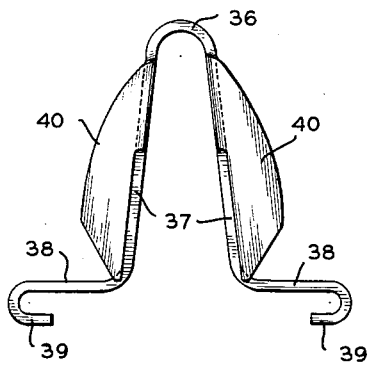
Figure 10:
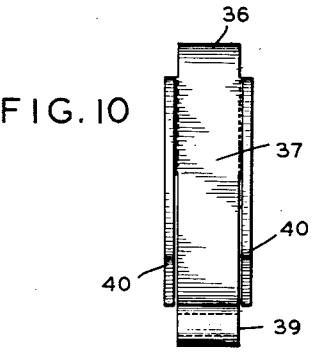
Figure 11:
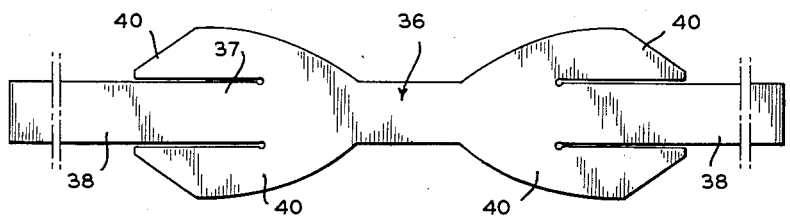

Further objects and advantages will be apparent from the following description taken in conjunction with the accompanying drawings wherein:

Fig. 1 is a fragmentary perspective illustrating one application of the invention;
Fig. 2, a side elevation of the fastener itself;
Fig. 3, a vertical section on the line 3—3 of Fig. 2;
Fig. 4, a horizontal section on the line 4—4 of Fig. 2;
Figs. 5 and 6, vertical sections through moldings, the fastener, and the support illustrating the use of the invention on two different types of molding;
Fig. 7, a detailed plan view of the retainer spring of Fig. 2;
Fig. 8, a fragmentary perspective illustrating the use of a modified type of spring clip;
Fig. 9, a front elevation of the clip itself;
Fig. 10, a side elevation;
Fig. 11, a blank from which the clip is produced; and
Fig. 12, a slightly modified form of spring clip.

Briefly stated the invention comprises an anchoring member for insertion between opposed edges into a channel molding and slidably adjustable along the same, a spring retainer slidably attached to the anchoring member and therefore self-adjusting, and a generally U-shaped spring clip adapted to be fastened to the anchoring member and thereafter forced through an opening in a support by the application of force against the front of the molding without the necessity of access to the opposite side of the support, such spring clip being adjustable along the anchoring member in a manner to compensate for misalignment or imperfect apertures which occur in mass production.

With continued reference to the drawings, the invention comprises an anchoring member in the form of a generally rectangular plate 10 having diametrically disposed corners or extremities 11, 12 with diametrically opposed curved toothed portions 13, 14 on one face to facilitate application to moldings of various widths and depths as well as to tapered moldings.

The anchoring member 10 is provided with a raised central portion 15 forming a holder 16 of a shape corresponding generally with the shape of the anchoring member 10 and with such raised portion 15 having a rectangular slot 17. The anchoring plate 10 is adapted to be inserted lengthwise between the inturned substantially parallel edges or flanges 18, 19 of a molding or trim strip 20 and such anchoring plate then rotated until its tips 11, 12, curved toothed portions 13 and 14 are located behind the inturned edges 18 and 19 of the molding.

In order to maintain the anchoring strip 10 in position a retainer spring is provided having a substantially circular body 21 and a pair of oppositely disposed spring arms 22, curved outwardly therefrom and terminating in feet 23, having convex engaging portions 24. The outer ends of the arms 22 engage against a surface such as a molding for exerting an axial thrust on the body 21, such body having a central opening 25 which receives a rivet 26, which rivet also is located in the rectangular slot 17 of the anchoring member or strip 10.

The anchoring member 10, spring clip, and rivet provide an assembly which can be easily applied and, when so applied, will not project beyond the outer surface of the flanges of the molding. This assembly may be held in place by a bolt but the present structure does not require a threaded bolt for fastening the molding by its attaching assembly to a support and the subsequent applying of a nut on the remote side of the support from the molding and which nut application is sometimes difficult for various reasons, such as small clearance, concealment, inaccessibility, misalignment or offset or improper location of apertures or parts, and the like.

For the present invention means is provided which can be readily applied to the anchoring member and thereafter the entire assembly can be applied and merely pressed into place by the application of force against the front face of the trim or molding. Such attaching means comprises substantially U-shaped clips 27 having outwardly bowed legs 28, outwardly turned feet 29, and inwardly turned extremities 30 providing hooks for the reception of opposite parallel side edges of the anchoring member 10. Due to the hooks being of spring metal the extremities will cut into the metal of the anchoring member and remain in fixed relation relative thereto. The clip 27 is adapted to be forced into an opening 31 in a support 32, such opening being slightly smaller than the overall distance between the opposite bowed leg portions 28 so that the device will snap into position and be held firmly in place.

In Fig. 1 is disclosed a molding of substantially uniform curvature, while in Figs. 5 and 6 are disclosed moldings 33 and 34 of irregular configuration. Due to the slot 17 in the anchoring member, along which the rivet 26 can slide, the retainer spring can adjust itself to the molding regardless of the irregular configuration of the molding, and the spring clips 27 can be adjusted to the edges of the anchor member 10 and therefore considerable versatility is afforded in the installation of molding strips.

If desired, the retainer spring may have teeth 35 (Fig. 7) located around the circumference or periphery of the body 21 between the spring arms 22. The teeth 35 may extend in a horizontal plane at an angle to the axis of the opening 25 and also at an angle from the plane of the body 21 to provide for positive gripping engagement between the body 21 and the cooperating central portion 15 of the holder 16. The teeth 35 act as ratchet teeth to prevent the plate 10 from being rotated relative to the body 21 and from becoming loosened due to vibration of the support 32 and thus provide a positive lock between the members 10 and 21.

It will be apparent that with the present invention attaching means is provided having wide application by which moldings of ½" to 1", 1" to 1¾", 1¾" to 3" widths may be secured in place by one of three size fasteners. Also, the molding would be held in place not only when the anchoring member is vertical, but in any other position. The openings in which the clips are received need not be in the center of the molding as the fastener is adjustable to any position due to its sliding action. Further, the invention is particularly appropriate where accessibility to the remote side of support is lacking and where it is necessary to remove upholstery, inside trim, or other structure, which is a time-consuming operation. Stability and permanence is promoted by the teeth along the curved edge of the anchoring member and by the spring metal of the clip biting into the opposite edges of the anchoring member when the device is in position.

Figure 12:
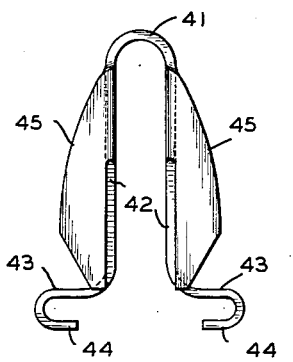

Instead of the spring clip 27 illustrated and described in Figs. 1 through 7 to maintain the anchoring strip in position, a modified type of retainer spring clip may be employed as illustrated in Figs. 8 to 11. Also a still further modified form of spring clip may be employed as illustrated in Fig. 12. In Fig. 11 a spring clip 36 of a U-shaped body of flat stock has outwardly bowed legs 37, outwardly turned feet 38 and inwardly turned extremities or end portions 39 providing hooks adapted to receive or fit over opposite parallel edges of the anchor strip 10 and be prevented from collapsing thereby. The clips being of spring metal will firmly engage the opposite edges of the anchoring strip and remain in fixed relation relative thereto.

Each of the clips 36 is provided with a series of wings 40 disposed substantially at right angles to the sides 37 to increase the overall size of the clip with each wing acting independently of the others when forcibly inserted into an opening not entirely circular. This independent action permits ease of insertion, imparts locking action in apertures of various sizes with only one spring clip when such has not heretofore been possible. Pressure applied to the edges of the four wings of the spring clip is transmitted to the inner or supporting members and automatically clamps the U-shaped member to the anchor strip and this action is reversed by spreading the wings outwardly so that they automatically push against and lock the spring clip in position after it has been inserted into an opening or aperture in a supporting plate.

The legs 37 in the clip of Figs. 8, 9 and 10 slightly diverged from the joined portion of the same while in Fig. 12 a spring clip 41 is provided with substantially parallel legs 42 and outwardly extending portions 43 with reversely bent end portions 44 providing spaced opposed hooks. Wings or wing forming extensions 45 also are provided at opposite side edges of said body attached lengthwise for a substantial distance along such edges near the bight portion thereof and detached lengthwise for a substantial length along said body from the free ends of such wings and remote from such bight portion, the line of detachment of the free ends of said wings from said body having fracture preventing rounded portions, each rounded portion being at the innermost termination of such line of detachment and when the clip is applied to the anchor strip 10 its body and wings are mutually reinforced against flexing adjacent the bight portion with the wings being permitted to flex along their detached free end portions. Also the free ends of the wings overlap the outwardly disposed extremities of the body of the clip. This prevents the wings from being forced into a position overlying such outwardly disposed portions 38 or 43 and when the clip is applied to a support there is no space between the ends of the wings and the outwardly disposed portions of the body in which the support can be caught or lodged.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A fastener for securing a finishing trim-type molding to a support having an opening, comprising an elongated anchor-plate having rounded diagonal portions whereby such plate can be applied between the inturned molding edges and rotated until it is engaged behind said edges, a molding engaging bowed spring having diverging legs, a central pivot slidably and pivotally connecting the central portion of said bowed spring with said elongated anchor-plate in a manner to be slidable lengthwise of said anchor-plate in order that said bowed spring may be adjusted to engage a molding at any longitudinal position relative to said anchor plate, and an attaching clip independent of said bowed spring and adjustably engaging said anchor-plate on the opposite side of the latter from said spring, said attaching clip having an enlarged tapered portion larger than the opening in the support into which the clip is to be inserted but of a structure to be readily forced through such opening and to engage the remote side of the support in which the opening is located, and with the clip of a material to compensate for the opening in the support being axially off-center of the clip and of varying dimensions relative to such clip.

2. A fastener for securing a finishing trim-type molding to a support having an opening, comprising an elongated anchor-plate having rounded diagonal portions whereby such plate can be applied between the inturned molding edges and rotated until it is engaged behind said edges, a molding engaging bowed spring having diverging legs, a central pivot slidably and pivotally connecting the central portion of said bowed spring with said elongated anchor-plate in a manner to be slidable lengthwise of said anchor-plate in order that said bowed spring may be adjusted to engage a molding at any longitudinal position relative to said anchor plate, and an attaching clip independent of said bowed spring and adjustably engaging said anchor-plate on the opposite side of the latter from said spring, said attaching clip having an enlarged tapered portion larger than the opening in the support into which the clip is to be inserted but of a structure to be readily forced through such opening and to engage the remote side of the support in which the opening is located, and with the clip of a material to compensate for the opening in the support being axially off-center of the clip and of varying dimensions relative to such clip, there being ratchet means between said spring and said anchor plate permitting the anchor plate to be rotated in one direction and held in such position against counter rotation.

3. A fastener for securing a finishing trim-type molding to a support having an opening, comprising an elongated anchor-plate having rounded diagonal portions whereby such plate can be applied between the inturned molding edges and rotated until it is engaged behind said edges, a molding engaging bowed spring having diverging legs, a central pivot slidably and pivotally connecting the central portion of said bowed spring with said elongated anchor-plate in a manner to be slidable lengthwise of said anchor-plate in order that said bowed spring may be adjusted to engage a molding at any longitudinal position relative to said anchor plate, and an attaching clip independent of said bowed spring and adjustably engaging said anchor-plate on the opposite side of the latter from said spring, said attaching clip having an enlarged tapered portion larger than the opening in the support into which the clip is to be inserted but of a structure to be readily forced through such opening and to engage the remote side of the support in which the opening is located, and with the clip of a material to compensate for the opening in the support being axially off-center of the clip and of varying dimensions relative to such clip, said attaching clip having end portions and a central portion of uniform relatively narrow width with portions intermediate said end and central portions disposed at right angles to the central and end portions of the clip and with the ends of the clip bent towards each other for attaining and engaging opposite edges of said anchor plate with said portions between said end and central portions having edges adapted to bite into said support.

4. The structure of claim 1 wherein said anchor-plate has a slot formed therein, said central pivot being secured to said central portion of said bowed spring and being slidably and pivotally received in said slot for adjustment therein, said diverging legs of said bowed spring extending from opposite edges of said anchor-plate, and said clip including feet of a shape to slidably engage said anchor-plate.

5. The structure of claim 1 wherein said clip is resilient and compressible from a larger relaxed size to a smaller size to pass through the openings in said support by being compressed to its smaller size and to expand to its larger size after passage through said opening, and said bowed spring extending away from the surface of said anchor-plate opposite said clip for engagement with said molding at a portion thereof intermediate the said edges of said molding.

6. A mounting clip comprising a resilient generally U-shaped body of flat stock of substantially constant width and having an intermediate bight portion and outwardly disposed extremities of a construction to engage spaced remote portions of an object in a manner to be prevented from collapsing by said object, integral angular wing forming extensions at opposite side edges of said body attached lengthwise for a substantial distance along the edges of the body near the bight portion thereof and detached lengthwise likewise for a substantial length along said body from the free ends of such wings and remote from said bight portion, the line of detachment of the free ends of said wings from said body extending in the same general direction as the line of connection of said wings to said body whereby said body and wings are mutually reinforced against flexing adjacent said bight portion when said outwardly disposed portions of said body are engaged with the remote opposite portions of an object, said wings being permitted to flex along their detached portions, the free ends of said wings overlapping the outwardly disposed extremities of said body thereby preventing such wings from being forced into a position overlying such outwardly disposed portions, and when the clip is applied to a support preventing such support from being lodged between the ends of the wings and the outwardly disposed portions of said body.

7. The structure of claim 6 in which the connection between each of said wings and said body being of a length at least equal to the width of said body.

References Cited in the file of this patent
UNITED STATES PATENTS

| | | |
|---|---|---|
| 2,178,719 | Cotter | Nov. 7, 1939 |
| 2,190,764 | Arnold | Feb. 20, 1940 |
| 2,531,348 | Amesbury | Nov. 21, 1950 |
| 2,659,950 | West | Nov. 24, 1953 |
| 2,671,254 | Meyer | Mar. 9, 1954 |
| 2,745,156 | Bedford | May 15, 1956 |
| 2,784,471 | Bedford | Mar. 12, 1957 |
| 2,866,372 | Fisher | Dec. 30, 1958 |
| 2,885,754 | Munse | May 12, 1959 |

FOREIGN PATENTS

| | | |
|---|---|---|
| 1,015,245 | France | 1952 |